US010910151B2

(12) United States Patent
Vix

(10) Patent No.: US 10,910,151 B2
(45) Date of Patent: Feb. 2, 2021

(54) DEVICE FOR THE CONTACT-FREE TRANSFER OF ELECTRICAL ENERGY INTO A MOVING SYSTEM OF A SHIFTING DEVICE

(71) Applicant: Schneeberger Holding AG, Roggwil (CH)

(72) Inventor: Martin Vix, Riken (CH)

(73) Assignee: SCHNEEBERGER HOLDING AG, Roggwil (CH)

( * ) Notice: Subject to any disclaimer, the term of this patent is extended or adjusted under 35 U.S.C. 154(b) by 0 days.

(21) Appl. No.: 15/383,930

(22) Filed: Dec. 19, 2016

(65) Prior Publication Data
US 2017/0194092 A1    Jul. 6, 2017

(30) Foreign Application Priority Data

Dec. 31, 2015  (EP) ..................................... 15405077

(51) Int. Cl.
*H01F 38/14*    (2006.01)
*H01F 3/10*    (2006.01)
(Continued)

(52) U.S. Cl.
CPC ............... *H01F 38/14* (2013.01); *H01F 3/10* (2013.01); *H01F 3/14* (2013.01); *H01F 21/06* (2013.01);
(Continued)

(58) Field of Classification Search
CPC ... H01F 38/14; H01F 3/14; H01F 3/10; H01F 27/24; H01F 21/06; H01F 2038/143; H01F 27/28; H01F 27/34; H02J 50/10
See application file for complete search history.

(56) References Cited

U.S. PATENT DOCUMENTS 5,737,211 A * 4/1998 Hirai ....................... H01F 38/14
                                                    363/144
5,814,900 A * 9/1998 Esser ...................... H01F 38/18
                                                    307/104
(Continued)

FOREIGN PATENT DOCUMENTS

DE    33 04 719 A1    8/1983
DE    195 45 220 A1   6/1997

OTHER PUBLICATIONS

The above references were cited in an EP search report dated Jul. 1, 2016 in priority application EP 15405077.7.

*Primary Examiner* — Jared Fureman
*Assistant Examiner* — Emmanuel Dominique
(74) *Attorney, Agent, or Firm* — Cowan, Liebowitz & Latman, P.C.; Mark Montague

(57) ABSTRACT

The present invention relates to a device for the contact-free inductive transfer of electrical energy from a first, preferably stationary system of a shifting device into a second system of the shifting device, which can be moved relative to the first system, comprising a magnetic circuit of a primary core, which is assigned to the first system and onto which a primary coil is wound, and a secondary core, which is assigned to the second system and onto which a secondary coil is wound. The secondary core is arranged so as to be capable of being shifted relative to the primary core along a shifting path, which preferably runs parallel to a shifting path of the shifting device. The primary core extends at least along the entire length of the shifting path. According to the invention, provision is made for the primary core to comprise at least one primary core gap, which is embodied along the entire longitudinal extension of the primary core. The invention further relates to a shifting device, in particular a (Continued)

linear shifting device, comprising such an energy transfer device as well as to a method for operating such a device.

15 Claims, 2 Drawing Sheets

(51) Int. Cl.
    *H01F 3/14*           (2006.01)
    *H02J 50/10*         (2016.01)
    *H01F 21/06*         (2006.01)
    *H01F 27/24*         (2006.01)

(52) U.S. Cl.
    CPC .............. *H01F 27/24* (2013.01); *H02J 50/10* (2016.02); *H01F 2038/143* (2013.01)

(56) References Cited

U.S. PATENT DOCUMENTS

| | | | |
|---|---|---|---|
| 6,499,701 B1* | 12/2002 | Thornton | B60L 13/06 246/194 |
| 2002/0057164 A1* | 5/2002 | Jin | H01F 38/14 336/115 |
| 2003/0020588 A1* | 1/2003 | Jin | H01F 1/26 336/233 |
| 2008/0303351 A1* | 12/2008 | Jansen | H02J 50/12 307/104 |
| 2014/0285138 A1* | 9/2014 | Duschl-Graw | B60L 5/005 320/108 |

* cited by examiner

DEVICE FOR THE CONTACT-FREE TRANSFER OF ELECTRICAL ENERGY INTO A MOVING SYSTEM OF A SHIFTING DEVICE

1. FIELD OF THE INVENTION

The present invention relates to a device for the contact-free, inductive transfer of electrical energy from a first, preferably stationary system of a shifting device into a second system of the shifting device, which can be moved with respect to the first system. The invention further relates to a (linear) shifting device comprising such an energy transfer device as well as to a method for operating the energy transfer device.

2. BACKGROUND

On principle, shifting devices, in particular one-dimensional or multi-dimensional or uniaxial or multiaxial linear shifting devices, respectively, for instance so-called X or XY shifting tables, consist of one or a plurality of uniaxial (linear) guide systems, respectively, which provide for the sometimes highly accurate moving and positioning of an object in one or a plurality of directions. For example, a very simple variant of a one-dimensional or uniaxial shifting device, respectively, consists of a guide rail, on which a guide carriage is guided so as to be capable of being shifted longitudinally. The guide rail therein forms the so-called stationary system of the shifting device, while the guide carriage, which is arranged so as to be capable of being shifted longitudinally, represents the second system, which can be moved relative to the first system. Various devices, for example measuring systems, drive devices, control and regulating devices, etc., which need to be supplied with electrical energy, can be arranged on the guide carriage, that is, in the movable second system. Traditionally, cabled energy transfer devices, in the case of which a flexible cable loom, for example, connects an energy source in the stationary first system to an energy consumer in the movable second system, are used for this purpose. The flexible design of the cable loom makes it possible thereby to follow the relative movement of the movable second system. However, such a cable loom is often perceived to be disadvantageous, because it can transfer mechanical interferences, for example vibrations, from the stationary system into the second system, which is to be positioned accurately, for example in the case of highly accurate positioning applications, for instance in the field of semiconductor technology.

To avoid such problem, the prior art proposes various cable-free or so-called contact-free energy transfer devices, respectively, in the case of which the electrical energy is sometimes transferred inductively according to the transformer principle. Such a device is known from Japanese publication JP 6 204 043 A, for example, which describes a linear shifting system for the contact-free energy transfer. The system consists of a primary core and of a secondary core, which are in each case embodied in an E-shaped manner and which are arranged so as to be located opposite one another, wherein the secondary core can be shifted along a longitudinal axis of the primary core with respect to the primary core. Primary or secondary windings, respectively, are attached to both E cores, in each case about the center web thereof, for the purpose of energy transfer. To avoid a rise of the self-induction inside the primary coil, the primary core is segmented periodically along the longitudinal axis thereof, in that filling segments of a non-magnetic and non-conducting material are introduced between magnetically conducting core sections. To reach the desired reduction of the self-induction, it is mandatory for the length of the secondary core to correspond to an integral multiple of the sum of the lengths of a filling segment and of a magnetically conducting core section, in longitudinal direction of the shifting path.

Due to the segmented design of the primary core, the device as a whole is limited with regard to the transferable energy in the case of the solution known from JP 6 204 043 A. In addition, the required minimum length of the secondary core along the shifting direction increases the moved total mass of the second system, which, in turn, can have a disadvantageous effect on the dynamics of the shifting system.

An arrangement for the contact-free transfer of signals between vehicle parts, which can be moved linearly against one another, is known from publication DE 195 45 220 A1. A transformer has pot core rails, which are guided so as to be capable of being moved in each other, in each case comprising an E-shaped profile. The primary winding and the secondary winding of the transformer are in each case wound onto the middle cross legs of the E-profile rails. An air gap, via which the inductive energy transfer takes place, is embodied between the two E-profile rails, which can be shifted against one another. In the case of the known arrangement, the creation of eddy currents is to be counteracted in that the pot cores are provided with a plurality of notches, which follow one another in the longitudinal direction of the pot cores and which are located vertically to the longitudinal direction of the pot cores.

In the case of the solution known from DE 195 45 220 A1, the air gap is comparatively large; the magnetic field can be weakened through this. The magnets must thus be chosen correspondingly larger for the energy transfer and the dimensions as well as the weight of the arrangement increase.

OBJECT AND SUMMARY OF THE INVENTION

It is thus the object of the present invention to provide a device for the contact-free inductive energy transfer for shifting devices, which has a significantly improved energy transfer efficiency as compared to the devices known from the prior art, and which preferably also contributes to an improvement of the dynamic properties of the shifting device.

This object is solved by means of an energy transfer device according to claim 1, a shifting device according to claim 14, as well as a method according to claim 15. Advantageous embodiments of the invention are the subject matter of the dependent claims.

The device according to the invention for the contact-free inductive transfer of electrical energy has a magnetic circuit, which, on the one hand, comprises a primary core, which is assigned to the first, preferably stationary system of the shifting device, and, on the other hand, a secondary core, which is assigned to the second system (capable of being moved relative to the first system), wherein a primary coil or a secondary coil, respectively, is wound onto the primary core or onto the secondary core, respectively. The secondary core together with the secondary coil is arranged so as to be capable of being shifted relative to the primary core together with the primary coil along a shifting path, which preferably runs parallel to a shifting path of the shifting device, wherein the primary core extends at least along the entire length of the shifting path of the secondary core.

The present invention is characterized in that the primary core comprises at least one primary core gap, which is embodied along the entire longitudinal extension of the primary core.

In contrast to the solutions known from the prior art, the eddy current losses can be minimized by means of the at least one primary core gap, an air gap in the primary core or in a leg of the primary core, respectively. This makes it possible for the device to also be suitable for an energy transfer for linear systems or (linear) shifting devices, respectively. Even though an open embodiment is at hand, the device causes only slight effects or no disadvantageous effects, respectively, from the aspect of electromagnetic compatibility. The device has an energy density, which is comparable to a static solution—thus to a non-shiftable arrangement. Very large powers can furthermore be transferred with cores (primary core and/or secondary core) comprising dimensions in the range of a few centimeters, for example powers in the range of several kilowatts.

According to an advantageous embodiment, provision is made for the secondary core to comprise at least one secondary core gap, which is embodied along the entire longitudinal extension of the secondary core. In the case of a device, which is further developed in such a way, the advantageous effects of primary core gap and secondary core gap complement one another with respect to the eddy current losses in the primary core and in the secondary core.

According to a further advantageous embodiment, provision is made for the at least one primary core gap and/or the at least one secondary core gap to be less than or equal to 0.2 mm, preferably less than or equal to 0.1 mm, along the entire longitudinal extension of the primary core or of the secondary core, respectively.

The primary coil and/or the secondary coil can furthermore be designed in such a way that they can be operated with an alternating current of up to 50 A. Primary coil and secondary coil can furthermore also be embodied in such a way that they can be operated with an alternating current/alternating voltage frequency of between 100 kHz and 500 kHz, in particular between 200 kHz and 400 kHz.

In the case of an operating frequency of between 100 kHz and 500 kHz, the primary core gap and/or the secondary core gap can be utilized in an advantageous manner, even though the magnetic flux density is reduced. The magnetic flux density of the arrangement lies in the range of 0.05 T, for example.

According to a further advantageous embodiment, provision is made for the primary core to exclusively comprise a magnetically conducting material or exclusively magnetically conducting materials; this differs from the prior art, where the primary core is segmented and is interrupted by filling elements of non-magnetically conducting material.

It was recognized according to the invention that, in the case of the device known from the prior art, a very large portion of the secondary core volume remains effectively unused for the embodiment of the magnetic circuit between primary and secondary side, in accordance with the dimension of the non-magnetic filling segment along the shifting direction. The magnetic coupling between primary and secondary side and thus the energy transfer capability is reduced hereby as a whole in a disadvantageous manner. On the other hand, the moved mass is increased unnecessarily because of the unused portion of the secondary core volume, which, in turn, can have a disadvantageous effect on the dynamics of the shifting system.

It was furthermore recognized that the minimization of the self-induction in the primary core—as considered to be essential in the prior art—can be forgone in favor of a larger magnetic coupling between primary and secondary side, in order to be able to transfer a significantly larger electrical power in an inductive manner. Due to the fact that the primary core according to the invention at hand exclusively comprises a magnetically conducting material or exclusively magnetically conducting materials, respectively, thus due to the fact that non-magnetic filling segments are forgone completely, the cross sectional surface permeated by the magnetic flux of the magnetic circuit between primary and secondary side and thus also the magnetic coupling and transferrable power, is at least twice as large as compared to the prior art.

It is not necessary thereby for the primary core to consist of a homogenous or integral magnetically conducting body, respectively, but it can also consist of a plurality, in particular 2, 3, 4, 5, 6, 7, 8, 9, 10 segments, in each case of one or a plurality of magnetically conducting materials, for example, which are lined up in longitudinal extension of the primary core, for instance, and which are arranged in direct contact with one another. It is possible, for instance, for the primary core to be comprised of a plurality of ferrite segments, for example of a length of 20 mm.

It goes without saying that it is also advantageous, when the secondary core exclusively comprises a magnetically conducting material or exclusively magnetically conducting materials. In addition, the secondary core can also consist of a homogenous or integral magnetically conducting body, respectively, or can be composed of a plurality of segments. Above-described advantageous embodiments of the primary core can analogously also be used in the case of the secondary core in this respect.

According to a further advantageous embodiment of the invention, provision can be made for the longitudinal extension of the secondary core in the direction of the shifting path to be able to be reduced as compared to the prior art, whilst otherwise being able to transfer at least the same electrical power from the first system into the second system. The moved mass of the second system is reduced through this in an advantageous manner, which, as a whole, contributes to an improvement of the dynamic properties of the shifting device. It is thus possible for the longitudinal extension of the secondary core in the direction of the shifting path to be less than or equal to 80 mm, in particular less than or equal to 40 mm, preferably less than or equal to 20 mm.

According to the present invention, however, the longitudinal extension of the secondary core in the direction of the shifting path is always shorter than the corresponding longitudinal extension of the primary core, which—as described above—extends at least along the entire length of the shifting path of the secondary core.

According to a further advantageous embodiment of the invention, the primary core can extend at least along the total length of the shifting path of the secondary core plus at least the longitudinal extension of the secondary core in the direction of the shifting path of the secondary core. It is thus ensured that the same magnetic coupling and thus the same energy transfer efficiency can be reached along the entire length of the shifting path of the secondary core. Advantageously, the primary core is embodied to be at least so long and to be arranged relative to the shifting path of the secondary core in such a way that the primary core in each case projects by at least half the measure, preferably by the entire measure of the longitudinal extension of the secondary core at both ends of the shifting path of the secondary core.

To realize the shiftability of the secondary core relative to the primary core along the shifting path, the primary core and the secondary core are arranged so as to be located opposite one another and so as to be spaced apart from one another via an air gap. Provision can thereby be made in an advantageous manner for the air gap to preferably be less than or equal to 1 mm, less than or equal to 0.5 mm, less than or equal to 0.2 mm, less than or equal to 0.15 mm or particularly preferably less than or equal to 0.1 mm in particular along the entire length of the shifting path. It is advantageous in particular, when the air gap remains constant along the entire length of the shifting path.

To be able to maintain the air gap to be constant along the entire length of the shifting path with a high precision from time to time, provision can be made according to a further advantageous embodiment of the invention for the energy transfer device to have a guide device for guiding the secondary core relative to the primary core along the shifting path. For example, the secondary core can thus be arranged directly on the movable second system of the shifting device and can be entrained by it or by the guide system of the shifting device, respectively. In the alternative or in addition, however, it is also possible for the secondary core to have a separate guide device, for example a linear guide, by means of which said secondary core is guided along the shifting path relative to the primary core so as to be capable of being shifted.

According to a further advantageous embodiment of the invention, the primary core and the secondary core are embodied as E cores, which are located opposite one another, comprising E-shaped cross sections across at right angles to the shifting path of the secondary core. Preferably, the primary coil or the secondary coil, respectively, is thereby wound around the respective center leg of the E core. It goes without saying, however, that other cross sectional profiles of the primary core or of the secondary core, respectively, are possible, for example so-called U cores, C cores, ER cores or EFD cores.

The magnetic coupling and thus the energy or power transfer efficiency, respectively, can also be increased, when the dimension of the center leg of the E core of the primary or secondary core, respectively, along the base of the E core is at least one and a half times, preferably at least twice as large as the corresponding dimension of the two side legs of the E core. This is so, because the cross sectional surface permeated by the magnetic flux is increased through this and the magnetic coupling between primary and secondary side is increased through this, in turn.

Particularly preferably, the primary core and/or the secondary core comprises a ferromagnetic material, in particular iron, or a ferrimagnetic material, in particular a ferrite, for example N87.

The primary coil and/or the secondary coil can be designed in such a way that they have at least 5 windings, in particular at least 7 windings, preferably 10 windings. In particular copper wire can be used for the windings, for example a copper wire comprising a cross section of 2 mm.

Accordingly, a further aspect of the present invention provides for a method for operating an energy transfer device according to the invention, in the case of which the primary coil is operated with an eddy current of up to 50 A. Provision can furthermore be made in the case of the method for primary coil to be operated with an alternating current/alternating voltage frequency in the range of between 100 kHz and 500 kHz, in particular between 200 kHz and 500 kHz. In particular in the case of such high frequencies (for instance starting at a few kHz), the primary core and the secondary core advantageously consist of ferrite.

A further aspect of the present invention relates to a shifting device, in particular a linear shifting device, comprising at least one device according to the invention for the contact-free, inductive transfer of electrical energy from a stationary first system of the shifting device into a second system, which can be moved to this end.

It is possible, for example, for the shifting device to be a one-dimensional or multi-dimensional or a uniaxial or multiaxial, occasionally linearly guided shifting device, for example an XY shifting table or an XYZ shifting table. In the case of multi-dimensional or multiaxial shifting devices, respectively, provision is then preferably made for an energy transfer device according to the invention for each axis, in order to transfer electrical energy in stages, for instance from a stationary laboratory system, between the axial stages, which move relative to one another. To supply an electrical consumer on the uppermost Y axial stage with electrical energy, for instance in the case of an XY cross table, provision can be made for a first energy transfer device according to the invention to transfer electrical energy between the system of the X-axis, which is stationary relative to a laboratory system, into the moving system of the X-axis. The moving system of the X-axis, in turn, corresponds to the system of the Y-axis, which is stationary thereto, from which the electrical energy can hereinafter be transferred into the moving system of the Y-axis via a second energy transfer device according to the invention. The energy transfer can thereby take place within the moving system of the X-axis or within the system of the Y-axis, which is stationary thereto, from the secondary side/secondary coil of the first energy transfer device to the primary side/primary coil of the second energy transfer device via an electrical conductor, for instance in a cabled manner.

Further details of the invention and in particular an exemplary embodiment of the proposed device will be explained below by means of the enclosed drawing.

DETAILED DESCRIPTION OF THE PRESENT INVENTION

Figure 1:
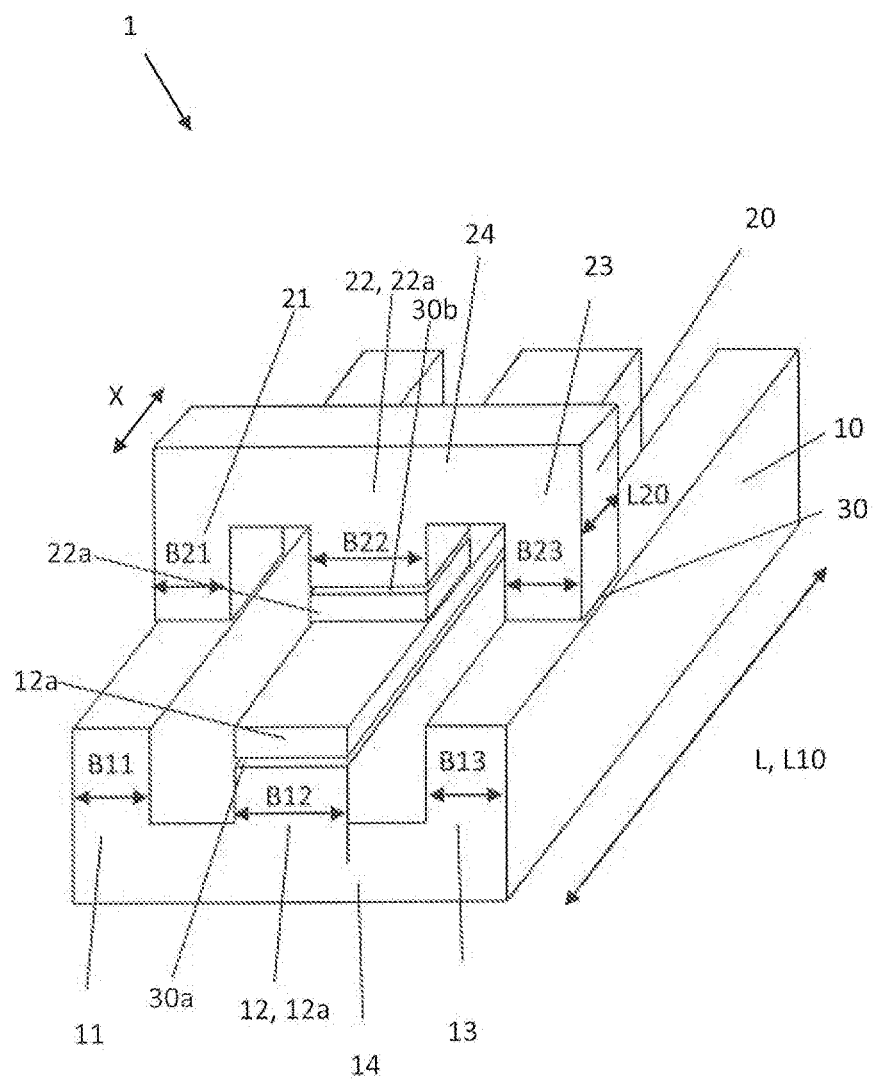
FIG. 1 shows a schematic illustration of an exemplary embodiment of the energy transfer device according to the invention (without primary and secondary coil) in a perspective view.
Figure 2:
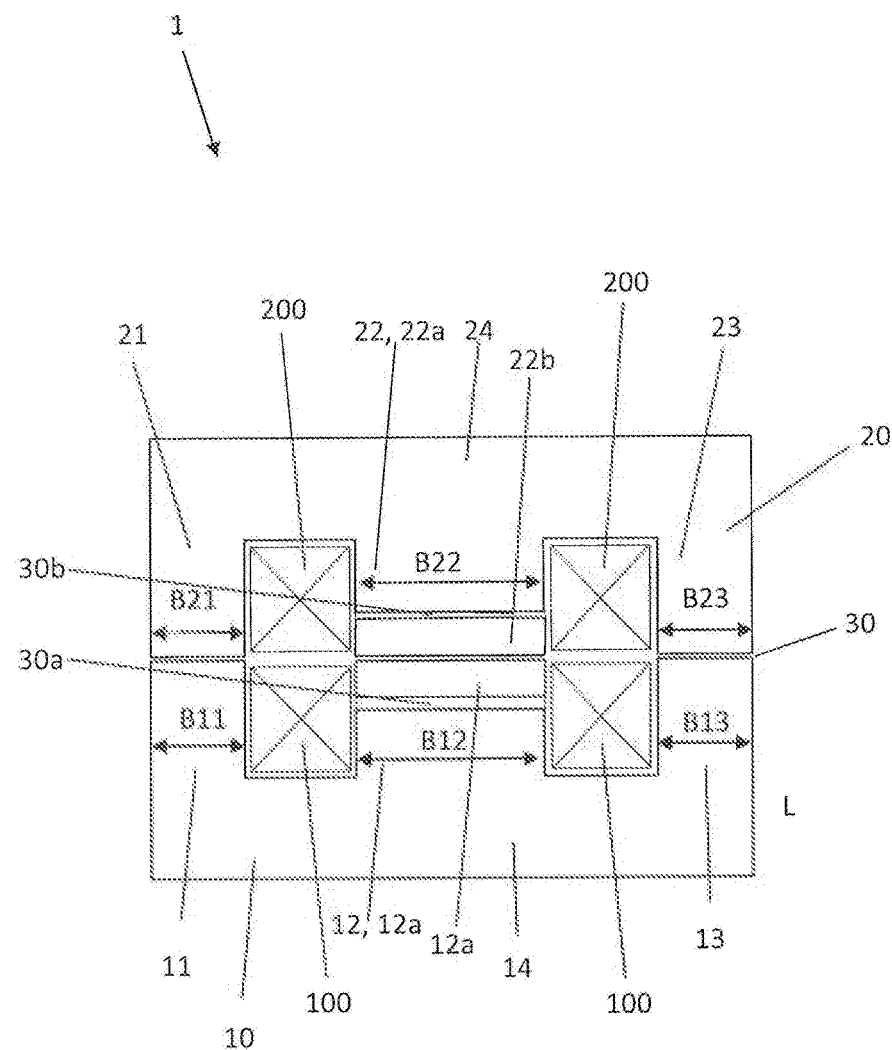
FIG. 2 shows a cross section through the energy transfer device according to FIG. 1.

FIGS. 1 and 2 show a possible exemplary embodiment of an energy transfer device 1 according to the invention, which is embodied to inductively transfer electrical energy from a first, preferably stationary system of a shifting device (not illustrated here) into a second system of the shifting device, which is moved to this end, in a contact-free or cable-free manner, respectively. The exemplary embodiment at hand shows a linear guided energy transfer device 1, which is specifically embodied to transfer electrical energy from the stationary into the moving system of a linear guide device.

As can be gathered from FIGS. 1 and 2, the energy transfer device 1 shown herein consists of a stationary part and of a movable part, namely of a primary core 10, which is stationary to the first system of the linear guide device, and a secondary core 20, which can be moved relative thereto and which is assigned to the second system of the linear guide device. Concretely, the secondary core 20 in the exemplary embodiment at hand can be moved parallel to the second system of the linear guide device along a shifting path X. In particular, it can be arranged directly on the second system, for instance a shifting table (not shown herein) of the linear guide device, so that it is entrained by the shifting table of the linear guide device along the shifting axis thereof.

It is also possible, however, for the secondary core 20 to be capable of being shifted relative to the primary core 10 along the longitudinal axis thereof by means of a separate guide device (not shown here). For this purpose, provision can in particular be made for the separate guide device for the secondary core to have its own drive device. It is also possible for the secondary core 20 to be capable of being moved relative to the primary core 10, not necessarily parallel to a shifting path of the linear guide device. On principle, thus, the shifting path of the secondary core 20 can deviate from a shifting path of the shifting device or linear guide device, respectively, with respect to the course and/or position. However, the course of the shifting path X of the secondary core 20 always corresponds substantially to the course of the longitudinal axis of the primary core 10. However, the shifting path X of the secondary core 20 preferably runs parallel to the shifting path of the shifting device or linear guide device, respectively.

A primary coil 100 (not shown in FIG. 1) is wound onto the primary core 10 and a secondary coil 200 is wound onto the secondary core 20. The primary coil 100 as well as the secondary coil 200 is fixedly connected to the respective core thereof by being wound onto the primary core 10 or the secondary core 20, respectively. That is, the primary coil 100 or secondary coil 200, respectively, does not move relative to the respective core thereof.

As can furthermore be gathered from FIGS. 1 and 2, the primary core 10 and the secondary core 20 in the exemplary embodiment at hand are in each case embodied as so-called E cores, which have E-shaped cross sections at right angles to the shifting path X of the secondary core 20. The E-shaped profile of primary core 10 and secondary core 20 in each case has a base 14, 24, a center leg 12, 22, as well as 2 side legs 11, 13; 21, 23 each. As shown in FIGS. 1 and 2, the primary core 10 and the secondary core 20 are in each case arranged so as to face one another with the open sides of the E profile (that is, the bases 14, 24 of the two E cores face away from one another), so that the respective corresponding side legs 11, 21 or 13, 21, respectively, as well as the center legs 12, 22 of the primary and secondary core 10, 20, are located opposite one another so as to be congruent.

As can in particular be seen in FIG. 2, the primary coil 100 and the secondary coil 200 are in each case wound around the center leg 12, 22 of the primary core 10 or secondary core 20, respectively, so that the windings of the two coils in each case run in the longitudinal depressions between the side legs 11, 13; 21, 23 and the center legs 12, 22 and in each case "turn around" on the face side on the ends of the primary core 10 or of the secondary core 20, respectively (into the respective other longitudinal depression on the opposite side of the center leg).

The windings of the primary coil 100 and of the secondary coil 200 preferably consist of a copper wire, for example of a copper wire with a diameter of approximately 2 mm. The primary coil 100 and the secondary coil 200 are preferably designed in such a way that they can be operated with a current of up to 50 A. The primary coil 10 and/or the secondary coil 20 preferably has at least 5 windings, in particular at least 7 windings, preferably 10 windings, in order to be able to generate a sufficiently high magnetic field.

To be able to transfer electrical energy along the entire shifting path of the shifting device or of the linear guide device, respectively, into the moving, second system, the primary core 10 extends at least along the entire length L of the shifting path X of the secondary core 20. However, the primary core preferably extends at least along the total length L of the shifting path X, plus the longitudinal extension L20 of the secondary core 20 in the direction of the shifting path X. As can be seen from FIG. 1, the longitudinal extension of the primary core 10 is thus always larger, generally significantly larger than the longitudinal extension L20 of the secondary core 20. Accordingly, the primary coil 100 is also significantly longer as compared to the secondary coil 200 or is embodied so as to be lengthened, respectively, because the windings of the primary coil 100 extend along the entire length of the primary core 10.

To keep the moving mass of the energy transfer device 1 as small as possible, the longitudinal extension L20 of the secondary core 20 in the direction of the shifting path X is less than or equal to 80 mm, in particular less than or equal to 40 mm, particularly preferably less than or equal to 20 mm. For comparison, the width of the primary core 10 or of the secondary core 20, respectively, that is, the expansion of both cores at right angles/vertically to the shifting path X, is approximately 65 m in the exemplary embodiment at hand.

The primary core 10 can exclusively comprise a magnetically conducting material or exclusively magnetically conducting materials, for example; in contrast to the prior art, the primary core is interrupted periodically by non-magnetic filling segments. The secondary core 20 can consist exclusively of magnetically conducting material or exclusively of magnetically conducting materials, respectively. Provision can furthermore be made for the primary core 10 and/or the secondary core 20 to either be embodied integrally or to be constructed of a plurality of partial segments, which are in direct contact with one another.

Particularly preferably, the primary core 10 and/or the secondary core 20 comprises a ferromagnetic material, in particular iron, or a ferrimagnetic material, in particular a ferrite, for example N87.

To increase the magnetic coupling between primary and secondary side of the energy transfer device 1, that is, between the primary core 10 and the secondary core 20, provision is made in the case of the energy transfer device 1 according to the exemplary embodiment at hand for the extension (width) B12, B22 of the center leg 12, 22 of the E-shaped primary or secondary core 10, 20, respectively, along the respective base 14, 24 of the E core to be at least twice as large as the corresponding extension (width) B11, B13; B21, B23 of the two side legs 11, 13; 21, 23 of the respective E core.

Due to the shiftability of the secondary core 20 relative to the primary core 10, provision is necessarily made for an air gap 30 between both cores 10, 20. To nonetheless keep the magnetic coupling sufficiently large, provision is made in the case of the energy transfer device 1 according to the exemplary embodiment at hand for the air gap 30 to preferably be smaller than 0.5 mm, particularly preferably approximately 0.1 mm along the entire length L of the shifting path X. To constantly maintain this air gap, the secondary core 20 is preferably guided as stably as possible along the entire shifting path X. It goes without saying that the opposite surfaces of primary core 10 and secondary core 20 are embodied in a correspondingly flat manner, so as to be able to constantly maintain an air gap 30 in the above-discussed magnitude along the entire shifting path X.

In addition to the air gap 30, which is present between the parts, which can be shifted relative to one another, the primary core 10 and the secondary core 20, the primary core 10 has a primary core gap 30a according to the illustrated exemplary embodiment. In the illustrated exemplary embodiment, the secondary core 20 also has a secondary core gap 30b.

According to the exemplary embodiment, the primary core gap 30a or the secondary core gap 30b, respectively, are in each case embodied in the center leg 12, 22. For example, the center leg 12 of the primary core 10 is subdivided into a first center leg part 12a and a second center leg part 12b. The two parts 12a, 12b are connected to one another by means of a suitable support material; provision can also be made for the primary core gap 30a not to run in the entire cross section of the respective leg 12 of the primary core 10, but to be provided as slit in the respective leg 12, which runs in the direction of the longitudinal extension L10 of the primary core 10 and which is embodied along the entire longitudinal extension L10. The same applies for the secondary core gap 30b or for the first and second center leg part 22a, 22b, respectively, of the center leg 22 of the secondary core 20.

The entire energy transfer device 1, in particular the primary coil 100 and/or the secondary coil 200, is further embodied in such a way that it can be operated with an alternating current/alternating voltage frequency in the range of between 100 kHz and 500 kHz, in particular between 200 kHz and 450 kHz.

In addition to the air gap 30 between the movable parts, provision is thus made according to the illustrated exemplary embodiment for further air gaps 30a, 30b in at least one of the legs of the primary core 10 or of the secondary core 20, respectively, which have a small gap width of less than 0.2 mm or less than 0.1 mm. The primary core gap 30a or the secondary core gap 30b, respectively, is in each case provided along the entire respective longitudinal extension L10, L20. Even though this transfer system is embodied in open construction and is operated at frequencies of larger than or equal to 100 kHz, only small or no relevant interferences, respectively, are generated with respect to the electromagnetic compatibility. It has a comparable energy density like a statically embodied system and provides for a transfer of powers in the kilowatt range, for example.

What is claimed is:

1. A device for the contact-free inductive transfer of electrical energy from a first, preferably stationary system of a shifting device into a second system of the shifting device, which can be moved relative to the first system, comprising:
   a magnetic circuit of a primary core, which is assigned to the first system and onto which a primary coil is wound, and
   a secondary core, which is assigned to the second system and onto which a secondary coil is wound,
   wherein the secondary core is arranged so as to be capable of being shifted relative to the primary core along a shifting path (X), which preferably runs parallel to a shifting path of the shifting device, and
   wherein the primary core extends at least along the entire length (L) of the shifting path, wherein the primary core comprises at least one primary core gap embodied in a leg of the primary core, wherein the primary coil is wound around said leg and wherein the primary core gap is embodied along the entire longitudinal extension (L10) of the primary core; wherein the primary core and the secondary core are embodied as E cores located opposite one another comprising E-shaped cross sections across at right angles to the shifting path (X) of the secondary core, wherein the primary coil is wound around a center leg of the E core of the primary core and wherein windings of the primary coil run in a longitudinal depression provided between the legs of the E core.

2. The device according to claim 1, characterized in that the secondary core comprises at least one secondary core gap, which is embodied along the entire longitudinal extension of the secondary core.

3. The device according to claim 1, characterized in that the at least one primary core gap and/or the at least one secondary core gap is less than or equal to 0.2 mm, preferably less than or equal to 0.1 mm, along the entire longitudinal extension of the primary core or the entire longitudinal extension of the secondary core, respectively.

4. The device according to claim 1, characterized in that the primary coil and/or the secondary coil are designed in such a way that they can be operated with an alternating current of up to 50 A and/or with an alternating current/alternating voltage frequency in the range of between 100 kHz and 500 kHz, in particular between 200 kHz and 450 kHz.

5. The device according to claim 1, characterized in that the primary core exclusively comprises a magnetically conducting material or exclusively magnetically conducting materials.

6. The device according to claim 1, characterized in that the longitudinal extension of the secondary core in the direction of the shifting path is smaller than or equal to 80 mm, smaller than or equal to 40 mm or smaller than or equal to 20 mm.

7. The device according to claim 1, characterized in that the primary core extends at least along the entire length of the shifting path plus the longitudinal extension of the secondary core in the direction of the shifting path.

8. The device according to claim 1, characterized in that the primary core and the secondary core are arranged so as to be located opposite one another and so as to be spaced apart from one another via an air gap, wherein the air gap is preferably less than or equal to 1 mm, less than or equal to 0.5 mm, less than or equal to 0.2 mm, less than or equal to 0.15 mm or less than or equal to 0.1 mm in particular along the entire length of the shifting path.

9. The device according to claim 1, characterized in that the secondary coil is wound around a center leg of the E core of the secondary core.

10. The device according to claim 9, characterized in that the extension of the center leg of the E core of the primary or secondary core, respectively, along the base of the E core is at least one and a half times, preferably at least twice as large as the corresponding extension of the two side legs of the E core.

11. The device according to claim 1, characterized in that the primary core and/or the secondary core comprises a ferromagnetic material, in particular iron, or a ferrimagnetic material, in particular a ferrite.

12. The device according to claim 1, characterized in that the device has a guide device for guiding the secondary core relative to the primary core along the shifting path.

13. The device according to claim 1, characterized in that the primary coil and/or the secondary coil has at least 5 windings, in particular at least 7 windings, preferably 10 windings.

14. A shifting device, in particular linear shifting device, comprising at least one device for the contact-free, inductive transfer of electrical energy according to claim 1, wherein the shifting device has a stationary system and a second system, which can be moved relative to the stationary system.

15. A method for operating a device for the contact-free, inductive transfer of electrical energy according to claim 1, characterized in that the primary coil is operated with an alternating current of up to 50 A and/or that the primary coil is operated with an alternating current/alternating voltage frequency in the range of between 100 kHz and 500 kHz, in particular between 200 kHz and 450 kHz.

* * * * *